United States Patent [19]
Murphy et al.

[11] Patent Number: 5,381,229
[45] Date of Patent: Jan. 10, 1995

[54] SAPPHIRE OPTICAL FIBER INTERFEROMETER

[75] Inventors: Kent Murphy, Roanoke, Va.; Ashish Vengsarkar, Allentown, Pa.; Shari Feth, Blacksburg, Va.; Richard Claus, Christiansburg, Va.; Sridhar Gollapudi; Anbo Wang, both of Blacksburg, Va.

[73] Assignee: Center for Innovative Technology, Herndon, Va.

[21] Appl. No.: 937,651

[22] Filed: Aug. 31, 1992

Related U.S. Application Data

[63] Continuation-in-part of Ser. No. 677,420, Mar. 29, 1991, abandoned.

[51] Int. Cl.⁶ .............................................. G01R 9/02
[52] U.S. Cl. ............................ 356/345; 356/43; 356/44; 374/117; 374/126; 374/131; 374/161; 250/227.19
[58] Field of Search .................. 356/43, 44, 345, 350, 356/346, 349; 374/117, 126, 131, 161; 250/227.19

[56] References Cited

U.S. PATENT DOCUMENTS

| | | | |
|---|---|---|---|
| 4,627,731 | 12/1986 | Waters et al. | 356/349 |
| 4,679,934 | 7/1987 | Ganguly et al. | 356/43 |
| 4,750,139 | 6/1988 | Dils | 364/557 |
| 4,859,079 | 8/1989 | Wickersheim et al. | 374/131 |
| 4,883,354 | 1/1990 | Sun et al. | 356/128 |

Primary Examiner—Samuel A. Turner
Assistant Examiner—LaCharles Keesee
Attorney, Agent, or Firm—Whitham, Curtis, Whitham & McGinn

[57] ABSTRACT

An optical interferometer comprises a multi-mode sapphire fiber as a high temperature sensor. One end of the sapphire fiber is coupled to a silica fiber and, in turn, to the sapphire fiber. The sapphire fiber sensor produces reference and sensor reflections that produce optical fringes at the output of a detector coupled to the silica optical fiber via an opto-coupler. The optical fringes are related to displacements of the sensor which, in turn, can provide an indirect measurement of pressure, strain or temperature of the surface.

10 Claims, 6 Drawing Sheets

SAPPHIRE OPTICAL FIBER INTERFEROMETER

CROSS-REFERENCE TO RELATED APPLICATION

This application is a continuation-in-part application of patent application Ser. No. 677,420 filed March 29, 1991 now abandoned.

BACKGROUND OF THE INVENTION

1. Field of the Invention

The present invention generally relates to the measurement of pressure, strain, temperature, or displacements in a high temperature environment and, more particularly, to an optical interferometer capable of measuring sub-nano meter displacements at temperatures over 2000° C. The invention is useful in detecting an optical path length change which may result from a variety of causes in a high temperature environment.

2. Description of the Prior Art

Measurement devices which employ optical fiber elements were first described in the late 1970s. Typically, they use optical fibers either as a light transmission element or as an element which is modified by external phenomena. The most sensitive optical fiber measurement devices developed thus far are based on optical interferometry. Optical fiber interferometers which use single mode silica optical fiber have been applied to a wide range of measurement problems during the 1980s.

The measurement of environmental parameters such as displacement, temperature, strain and pressure at high temperatures is increasingly difficult because the materials used to fabricate the sensing elements deform or melt at sufficiently high temperatures. The softening temperature of silica optical fibers is typically between 900° C. and 1000° C. At temperatures equal to or above this, silica optical fibers are not useful, even if they are coated with materials which melt at higher temperatures.

One approach to fiber-based measurements at higher temperatures is to use fibers made of sapphire. Currently, sapphire fibers are only made in the form of rods of diameters of 50 microns or larger, and the rods lack a cladding or a coating similar to those which are fabricated as part of conventional silica fibers. The large diameter of the sapphire rod materials does not allow single mode optical propagation and, thus, does not allow the implementation of optical fiber interferometers of the silica single mode fiber type described above.

Optical fiber measurement systems have been implemented using sapphire rods as a transmission devices to transport optical signals in a region of high temperature. Since the melting temperature of sapphire is above 2000° C., operation at temperatures much higher than those obtainable with silica fibers is possible. Applications in the past have only included using such sapphire rods as simple transmission devices, and not as elements in optical interferometer configurations. Those applications have specifically included the use of sapphire rod materials as a "window" to observe the temperature in a hot region, or as an infrared transmission element to observe the infrared absorption characteristics of the surrounding environment.

U.S. Pat. No. 4,859,079 to Wickersheim et al. and U.S. Pat. No. 4,883,354 to Sun et at., both assigned to Luxtron, Inc., use the principle of blackbody radiometry where the radiation from a body of known (or unknown) emmissivities is correlated to its specific wavelength properties. By using ratio-pyrometry, that is, using information at multiple wavelengths and taking ratios to remove extraneous effects, temperature information is obtained. The use of multiple wavelengths does not involve any interferometric technique. Japanese laid open application 61178624 discloses a high temperature measurement device which uses a thin film made of platinum or iridium at the tip of a sapphire fiber. As the temperature of the surface changes, the radiation energy from the film is measured and information from the spectral brightness is used to acquire temperature information.

U.S. Pat. No. 4,918,492 to Ferdinand et al. discloses a Michaelson interferometer in which optical fibers are provided between a light source and an optical coupler, from the coupler to a collimator, and from the coupler to a photodetector. There is no optical fiber exposed to high temperature. Each of the optical fibers used by Ferdinand et al. are single mode fibers, and the use of a multimode fiber in the Ferdinand et al. interferometer would render the device inoperable. None of the fibers in the Ferdinand et al. interferometer are themselves part of the interferometer per se; rather, they provide only light conducting paths.

U.S. Pat. No. 4,750,139 to Dils discloses a blackbody radiation sensing optical fiber thermometer system that employs a sapphire rod terminated in a black body tip composed of iridium sputtered onto the end of the rod. The sapphire rod of Dils in not used in an interferometer system.

U.S. Pat. No. 4,627,731 to Waters et al. discloses a heterodyne optical interferometer which is particularly adapted to measuring the vibration of a workpiece. Two light beams having different optical paths are chosen so that the two light beams are incoherent. These two light beams are modulated by respective Bragg cell acousto-optic modulators, and the modulated light beams are combined in a coupler and provided to an optical fiber. Since the two modulated light beams are incoherent, no interference occurs between the beams propagating in the optical fiber. A portion (i.e., the reference beam) of the two modulated light beams is internally reflected from an end face of the optical fiber, and the remaining power of the combined beam (i.e., the measurement beam) exits the end of optical fiber, is collimated by a first lens and focused by a second lens on a workpiece surface. The reflected light from the work surface traverses the two lenses and reenters the optical fiber. The length of the optical path traversed by the measurement beam is selected so that the first beam portion thereof has an overall optical path length that is approximately equal to the overall second beam optical path length to within the coherence length of the laser diode. As a result, the second beam portion of the reference beam and the first beam portion of the measurement beam will interfere because they are once again coherent. This interference yields a frequency modulated (FM) beam with a carrier frequency equal to the frequency of the optical modulators and a modulation signal proportional to the vibration of the workpiece surface. Thus, Waters et al. make vibration measurements at low temperature with FM heterodyne apparatus. The FM heterodyne interferometric technique employed by Waters et al. cannot measure quasi-static parameters such as pressure, strain, temperature, or displacements in a high temperature environment.

U.S. Pat. No. 4,679,934 to Ganguly et al. uses a black body radiating member on the end of bundle of sapphire fiber elements. Optical signals from the black body radiating member are conducted along the sapphire fiber bundle to a low temperature fiber bundle. The light output from the low temperature fiber bundle is collimated by a first lens, passed through a filter and focused by a second lens before being split by a beam splitter into two beams. These beams are passed through respective optical density attenuators before being detected by photodiodes. The beam splitter passes 90% of the light beam to one of the photodiodes and only 10% to the other photodiode, and the purpose of this arrangement is to increase the dynamic range of the measurement. The bundle of sapphire fiber elements used by Ganguly et al. is not a sapphire fiber, and it is used only to conduct light from a black body radiator and is not part of an interferometric system.

SUMMARY OF THE INVENTION it is therefore an object of the present invention to provide an interferometric device for high temperature sensing of an optical path length change due, for example, to a change in pressure, strain, temperature, displacements, or chemical composition.

It is another object of the invention to provide an optical interferometer of the type using single mode fibers but which is capable of measurements at temperatures in excess of 2000° C.

The preferred embodiment of the invention allows the use of large diameter multi-mode sapphire rod material in an interferometric configuration. Since it has been known for some time that such interferometric configurations, implemented using single mode fibers, such as silica fiber, at low temperatures, allow high sensitivity, and since it has been known that sapphire rod materials can withstand high temperatures, the invention has immediate application in the measurement of environmental parameters at high temperatures.

Three areas of application will immediately benefit from the present invention. The first is the characterization of materials which require high temperature processes during their fabrication. Sensors for the monitoring of metal, ceramic and high temperature advanced composite material processing are examples. The second is the characterization of materials and environmental conditions during normal material lifetime and operational events. Examples include the in situ monitoring of materials in high temperature engines, fuel cells, furnaces or combustors, as well as the measurement of materials on the hot leading edges of high speed aerospace structures. The third is the measurement of materials at high temperature as they deteriorate or are damaged during normal use. Examples are the in situ testing of high temperature engine or turbine components.

According to the invention, there is provided an optical interferometer comprising a sapphire fiber as the high temperature sensing probe. One end of the sapphire fiber is coupled to a silica fiber via a GRIN (grated refractive index) lens. Light is input to the silica fiber by a laser. The GRIN lens collimates the light exiting the silica fiber, and the collimated light travels through the sapphire fiber. The light is partially reflected at the sapphire/air interface, and the transmitted light beyond this interface is reflected from a surface of interest. The first reflection, that is the reflection from the sapphire/air interface, is the reference beam while the phase of the second reflection produces optical fringes at the output of a detector coupled to the silica optical fiber via an opto-coupler. The optical fringes are related to changes in optical path length. Such changes in optical path length may be due to displacements of the surface which, in turn, can provide an indirect measurement of pressure, strain, acoustic waves, or temperature of the surface. A change in optical path length could also be due to a change in chemical composition in the environment being monitored.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
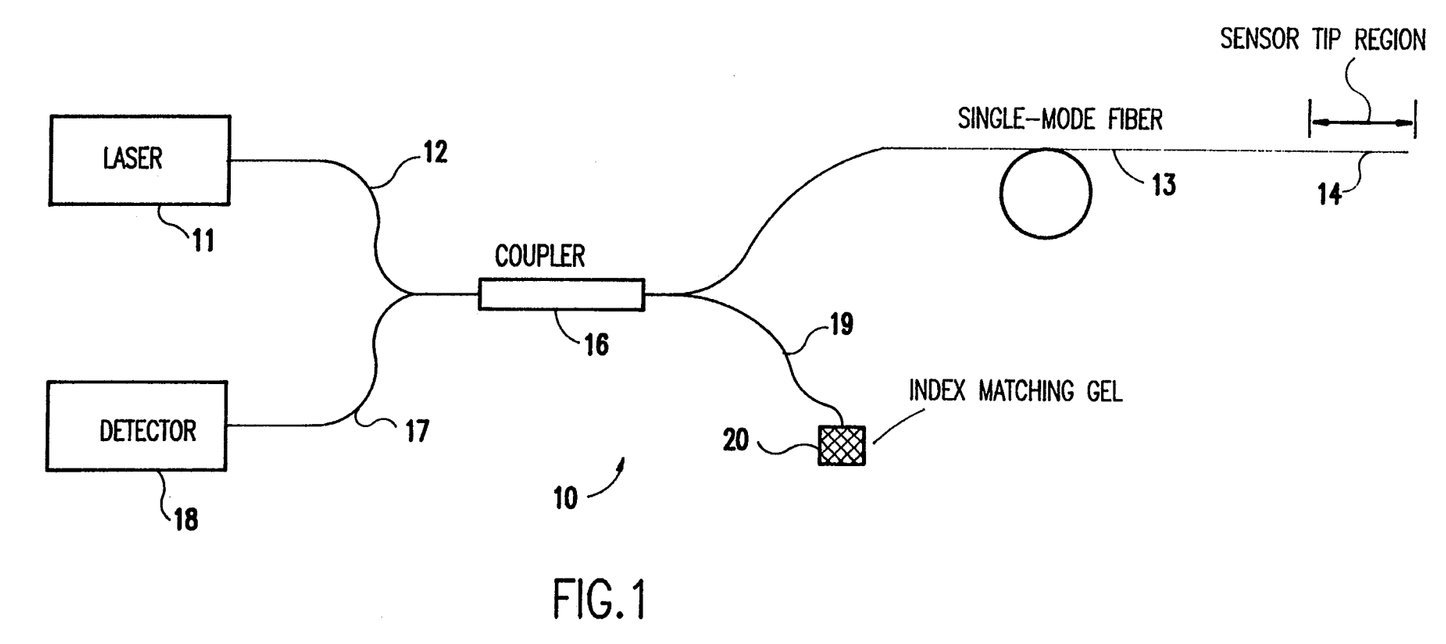
FIG. 1 is a schematic diagram of the optical interferometer according to a preferred embodiment of the invention.

Referring now to the drawings, and more particularly to FIG. 1, there is shown a high temperature interferometer 10 which comprises a laser 11 providing light coupled to one end of a single mode silica optical fiber 12. The other end of the single mode silica optical fiber 12 is coupled to a length of multimode sapphire fiber 14 to form the interferometer cavity. The connection of the of the multimode sapphire fiber 14 to the single mode silica optical fiber 12 is preferably by fusion splicing.

A laser beam is launched is launched by the laser 11 into the single mode silica fiber 12 and propagates via coupler 16 and single mode silica fiber 13 to the sapphire fiber 14. Due to the difference in the refractive index between the silica and sapphire fibers, part of the incident laser light is reflected at the interface. The light transmitted into the sapphire fiber excites multiple propagation modes. Since the numerical aperture of the single mode fiber is very small, primarily low order modes in the sapphire fiber are excited. The propagating light in the sapphire fiber 14 is reflected by the free endface in air. Without reflective coatings, the endface provides about 7% reflectance (the refractive index of sapphire being approximately 1.7) caused by Fresnel reflection. At the silica-sapphire fiber splice, a fraction of this reflected light from the free end face of the sapphire fiber is recoupled to the silica single mode fiber 13. The interference of the two reflections, i.e., from the silica-sapphire fiber splice and from the free endface of the sapphire fiber, respectively, gives rise to an interference fringe output. The reflected light is coupled by coupler 16 and single mode silica fiber 17 to a detector 18 which detects the interference fringe output. An optional single mode silica fiber 19 terminated in an index matching gel 20 may be connected to the coupler 16 to provide good signal isolation at the detector.

Since the optical phase of the light traveling in the sapphire fiber 14 is highly sensitive to temperature and longitudinal strain, this sensor is useful for the measurements of these parameters. As the output fringe is produced by the interference of the two reflections from the fiber splice between the silica and the sapphire fibers and the free endface of the sapphire fiber, this sensor is a Fizeau fiber optic interferometer where the Fizeau cavity is composed of a length of multimode sapphire optical fiber. Because this sapphire fiber, which acts as the sensing element, has a very high melting temperature point ($\sim 2030°$ C.), the sensor can be operated in high temperature environments for measurements of temperature, stain and other parameters that change the optical path in the sapphire fiber 14. Furthermore, because of the small geometry and flexibility of the sensing tip region, the sensor is embedable into some materials such as composite materials. Although subjected to a hostile environment, the sensor possesses high resolution and accuracy.

Figure 2:
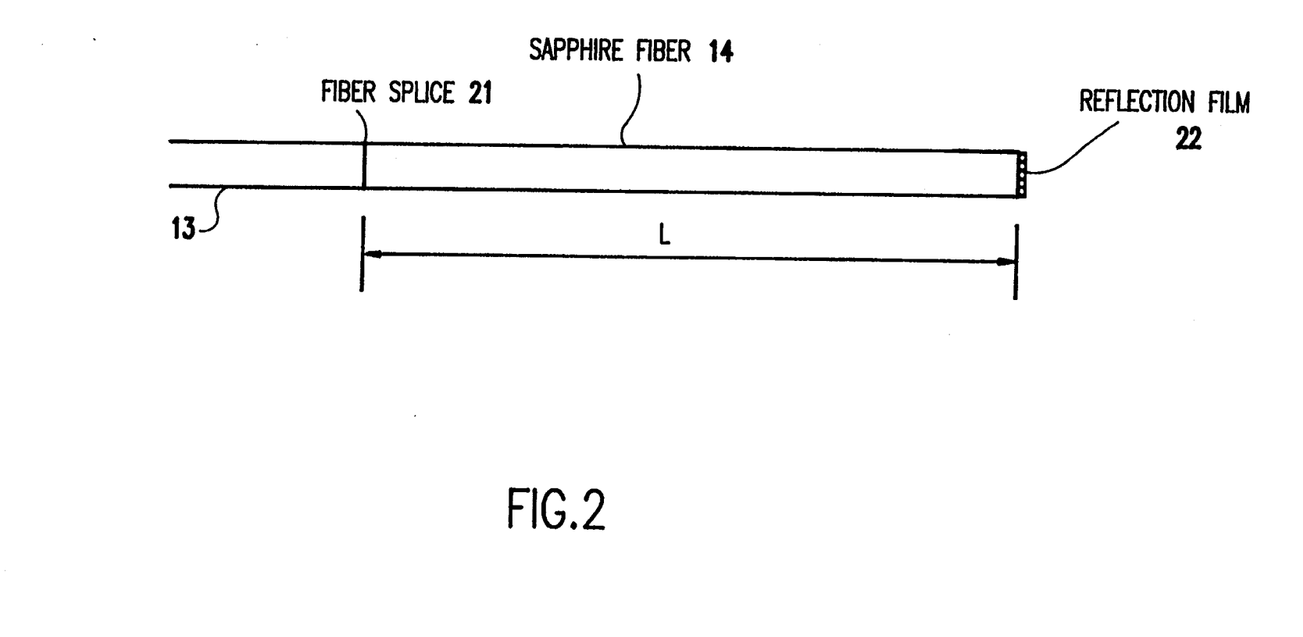
FIG. 2 is an enlarged view of the sapphire sensor used in the preferred embodiment of the invention shown in FIG. 1.

FIG. 2 is an enlarged view of the single mode silica fiber 13 and the multimode sapphire fiber 14 as used in the embodiment of the invention shown in FIG. 1. The fusion fiber splice 21 connects the two fibers 13 and 14. The length L of the sapphire fiber 14 is chosen to the particular application, being sufficient to protect the silica fiber 14 and the fusion splice 21 from adverse effects of the high temperature, hostile environments where measurements are being made. To improve the second reflection from the end face of the sapphire fiber 14, an optional reflective film 22 may be added to the endface.

Figure 3:
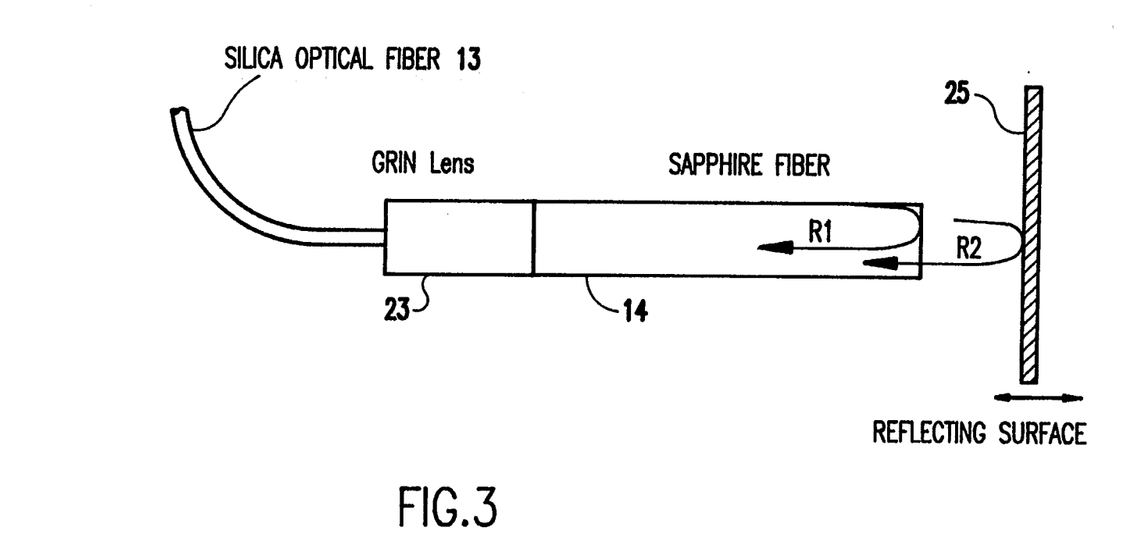
FIG. 3 is an enlarged view of an alternative construction of the sapphire sensor.

FIG. 3 shows another embodiment of the sensor according to the invention where the transition from the single mode silica fiber 13 to the multimode sapphire fiber 14 is made with a GRIN (Graded Index) lens 23 attached to one end of a sapphire fiber 14. In the example shown in FIG. 3, tile other end of the sapphire fiber 14 is positioned proximate to a surface 25 of interest. This surface is in a high temperature environment (e.g., over 2000° C.), and its displacement perpendicular to the sapphire fiber 14 is to be measured by the interferometer.

Figure 4:
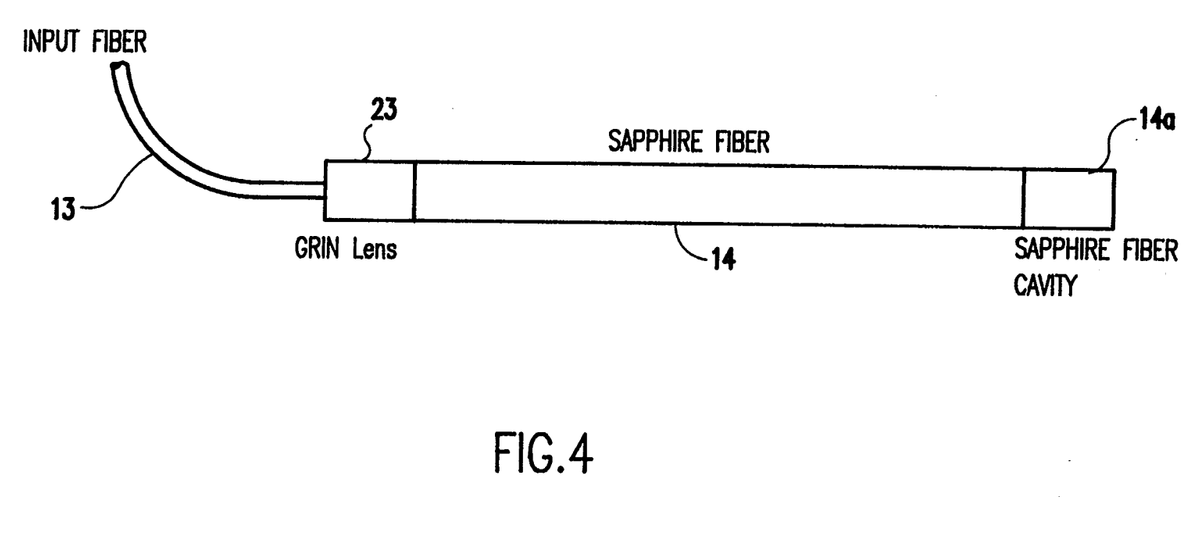
FIG. 4 is an enlarged view of another alternative construction of the sapphire sensors.

The GRIN lens 23 is a commercially available component. It is a cylindrical lens element which allows the simple coupling of cylindrical fibers or rods. In this application, the GRIN lens 23 is used specifically to collimate the light which exits from a single mode silica optical fiber 13 into the sapphire fiber 14 and to focus the returning light onto the core of the silica fiber 13 so it is transmitted back along the fiber. In the embodiment shown in FIG. 3, the collimated light from GRIN lens 23 travels through the sapphire fiber 14 and is partially reflected at the sapphire/air interface and also at the reflecting surface 25. The first reflection, $R_1$, is the reference beam, while the phase of the second reflection, $R_2$, produces optical fringes that are related to the displacement of the surface 25. More specifically, the light from the reflections $R_1$ and $R_2$ travel back through the sapphire fiber 14 and the GRIN lens 23 to the silica optical fiber 13. The cavity of the interferometer described here is created at or near the end of the sapphire fiber 14. In the example shown in FIG. 3, the cavity is defined by the sapphire/air interface and the surface 25. Alternatively, a separate section of sapphire rod may be attached to the main body of the sapphire rod 14 to define the cavity region. This is shown in FIG. 4 where the sapphire fiber cavity 14a is attached to the end of the sapphire rod 14. Temperature or strain change the length of this cavity region 14a, just as in the case of the sapphire fiber 14 in tile embodiment shown in FIG. 1, thus producing a phase difference between the optical signals reflected from opposite ends of the cavity region, providing a measurement of the temperature or strain.

Figure 5:
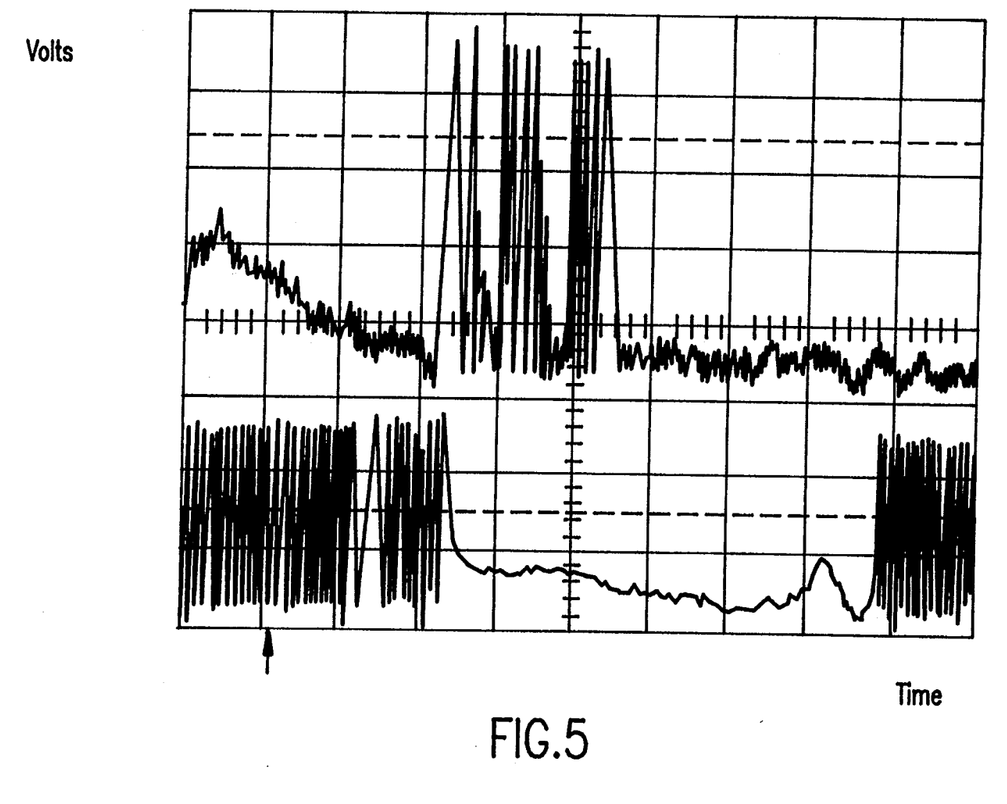
FIG. 5 is an oscillograph of optical fringes obtained from the interferometer according to the invention.

FIG. 5 shows an oscillograph of a converted electrical signal derived from the optical signal input to the detector 18. The upper trace shows a typical set of peaks obtained from the interferometer output. The lower trace is an expanded view, not on the same amplitude scale, of the upper trace. Each group of peaks in the upper trace is actually composed of hundreds of peaks, and the groups of peaks are separated by a time period. In the lower trace, the peaks in the left third of the trace are the trailing group of peaks of, for example, the first group in the upper trace, and these are spaced from the leading group of peaks in the next group.

Figure 6:
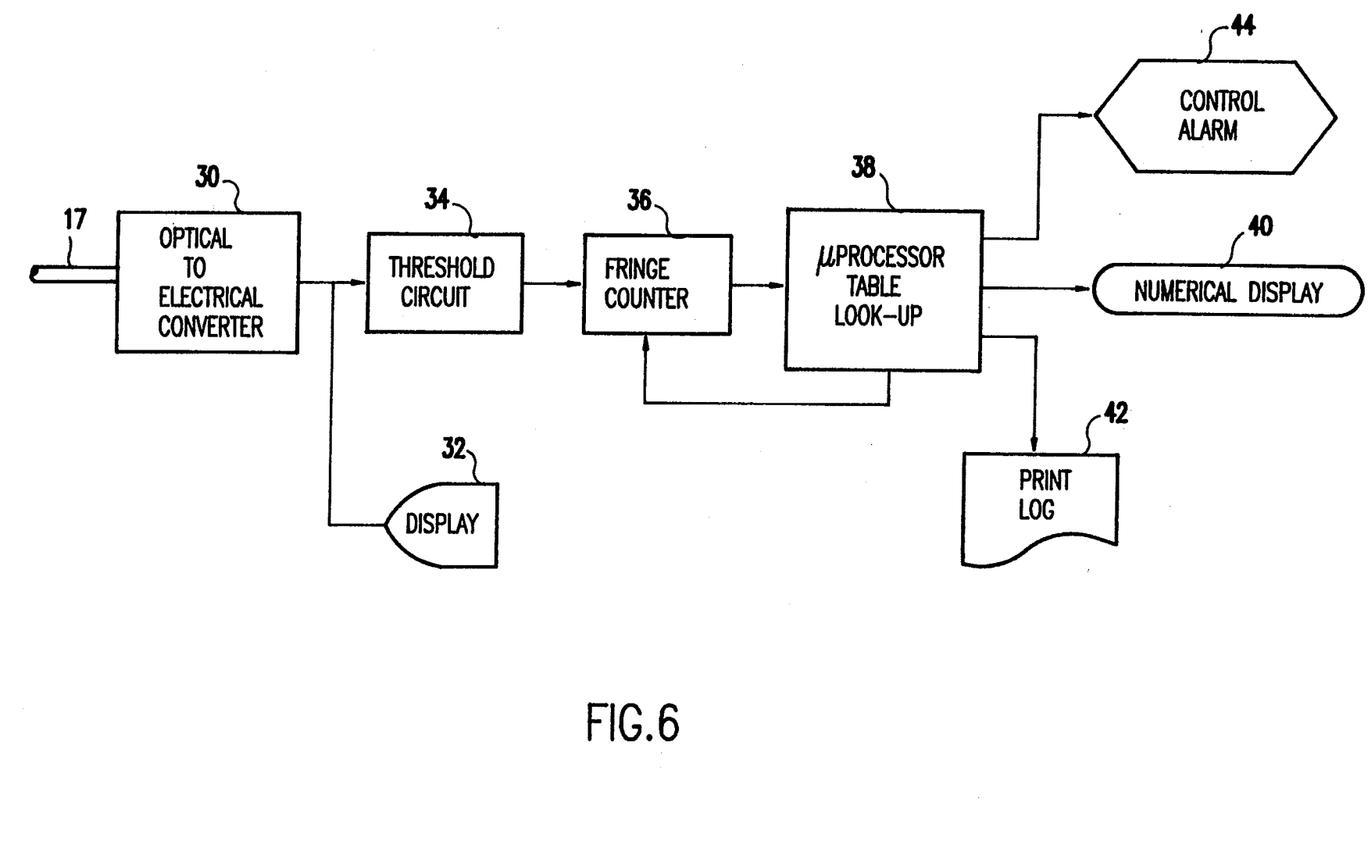
FIG. 6 is a block diagram of the detector shown in FIG. 1.

The detector 18 may be microprocessor based signal processor programmable to correctly interpret the interferometric measurement made. As shown in FIG. 6, the optical signal on the silica fiber 17 is first convened to an electrical signal in optical-to-electrical converter 30. The output of this converter can be directly displayed by a display monitor 32, such as an oscilloscope. In fact, the oscillograph shown in FIG. 5 is an example of the display produced by monitor 32.

In a practical application, the monitor 32 would not be used except for installation and test purposes. Rather, the output of converter 30 is applied to a voltage amplitude threshold circuit 34 which generates a series of pulses. These pulses have a period corresponding to the period or spacing of the optical fringes. The pulse output from tile threshold circuit is counted in fringe counter 36 over a time period controlled by a microprocessor 38 to produce a resulting count that is a measure of the period of the optical fringes. This count is a digital value which is input to the microprocessor 38. Since the interferometric measurements are generally not a linear function of the variable (e.g., temperature, pressure, strain) which it is desired to be measured, the microprocessor 38 may include table look-ups in Electronically Programmable Read Only Memories (EPROMs) for a specific application. The digital value input by fringe counter 36 is used to address a table look-up to generate an output proportional to the measured variable.

The output of the measured variable generated by the microprocessor 38 may be displayed by a display device 40, such as a numerical readout. Alternatively or in addition, the measured variable generated by the microprocessor 38 may be logged and printed by a printer 42 to provide a history of the measured variable. However, in many applications, the microprocessor 38 will further process the measured variable, either for process control or alarm functions or both, as indicated by control and alarm 44. Thus, the microprocessor 38 may be part of a feedback control in a continuous, high-temperature manufacturing process, in which case the output of the microprocessor 38 would be a control to the process. The microprocessor 38 may alternately be part of a monitoring system for high-temperature engines, turbines, furnaces or the like, in which case the microprocessor 38 would generally provide both the measured variable display 40 and the print log 42 and, perhaps, the alarm function 44. In the third application, the microprocessor 38 may be part of an imminent failure detection system. For example, the interferometer may be used to detect a potential failure of a turbine blade in a gas turbine engine, in which case the output of the microprocessor 38 would actuate an alarm 44.

The sensor according to the invention can be operated in two regimes: a linear mode where the output of the sensor is directly proportional to the measured variable, and a nonlinear mode. The linear mode is exemplified by measuring displacements. Every fringe corresponds to a displacement of $\lambda/2$, where $\lambda$ is the wavelength of the laser source being used. The fringe counter 36 generates a count output which is a direct measure of displacement. Typically, the nonlinear mode is preferred mode of operation. The displacements measured provide information about other parameters. For example, if strain is being measured, a knowledge of the sensor gauge length implies that strain values can be found by calculating displacement gauge length. That is, since the number of fringes gives an exact value for the displacement, the displacement is known and this provides a measure of strain. Similarly, for measurement of temperature, the measured displacements can be correlated with the coefficients of thermal expansion.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. An optical interferometer for use in high temperature environments, comprising:
   a laser light source;
   a single mode optical fiber coupled at one end to said laser light source and conducting light to an opposite end;
   a sapphire fiber having a first end and a second end;
   said opposite end of said single mode optical fiber coupled to said first end of said sapphire fiber to form a first interface that reflects a portion of said light conducted by said single mode optical fiber back into said single mode fiber optical fiber and transmits a portion of said light conducted by said single move optical fiber into said sapphire fiber;
   a second interface at said second end of said sapphire fiber to reflect at least a portion of said light transmitted into said sapphire fiber back through said sapphire fiber into said single mode optical fiber, whereby said sapphire fiber forms a cavity of said interferometer with light reflected from said first interface serving as a reference reflection and light reflected from said second interface serving as a sensor reflection responsive to changes in an optical path length of said sapphire fiber; and
   detector means for receiving an interference pattern generated by said reference reflection and said sensor reflection, said detector means analyzing optical fringes produced by said interference pattern to detect changes in said optical path length of said sapphire fiber.

2. The optical interferometer recited in claim 1 wherein said single mode optical fiber and said sapphire fiber are connected by fusion splicing, said sapphire fiber being a Fizeau cavity of said interferometer and said reference reflection is produced at an interface between said single mode optical fiber and said sapphire fiber and said sensor reflection is produced at a free endface of said sapphire fiber.

3. The optical interferometer recited in claim 2 wherein said sapphire fiber is flexible and adapted to be embedded in a composite material.

4. The optical interferometer recited in claim 1 wherein said sapphire fiber comprises first and second sections of sapphire fiber joined to form an interface, said first section being coupled to said single mode fiber and said second section forming a cavity of the interferometer, and said reference reflection is produced at said interface and said sensor reflection is produced at a free endface of said second section.

5. The optical interferometer recited in claim 1 wherein said variable parameter is a linear function of a number of optical fringes produced by said reflections.

6. The optical interferometer recited in claim 1 wherein said variable parameter is a nonlinear function of a number of optical fringes produced by said reflections.

7. The optical interferometer recited in claim 6 wherein said variable parameter is a temperature of said surface, said detector means further storing coefficients of thermal expansion and comprising means for converting said number of optical fringes into a measure of temperature.

8. The optical interferometer recited in claim 6 wherein said variable parameter is strain produced in said surface, said detector means further storing gauge lengths and comprising means for converting said number of optical fringes into a measure of strain.

9. The optical interferometer recited in claim 1 wherein said variable parameter is an acoustic wave, said detector means further convening said number of optical fringes into a measure of said acoustic wave.

10. The optical interferometer recited in claim 1 wherein said variable parameter is a change in chemical composition, said detector means further converting said number of optical fringes into a measure of change in chemical composition.

* * * * *